Figure 1:
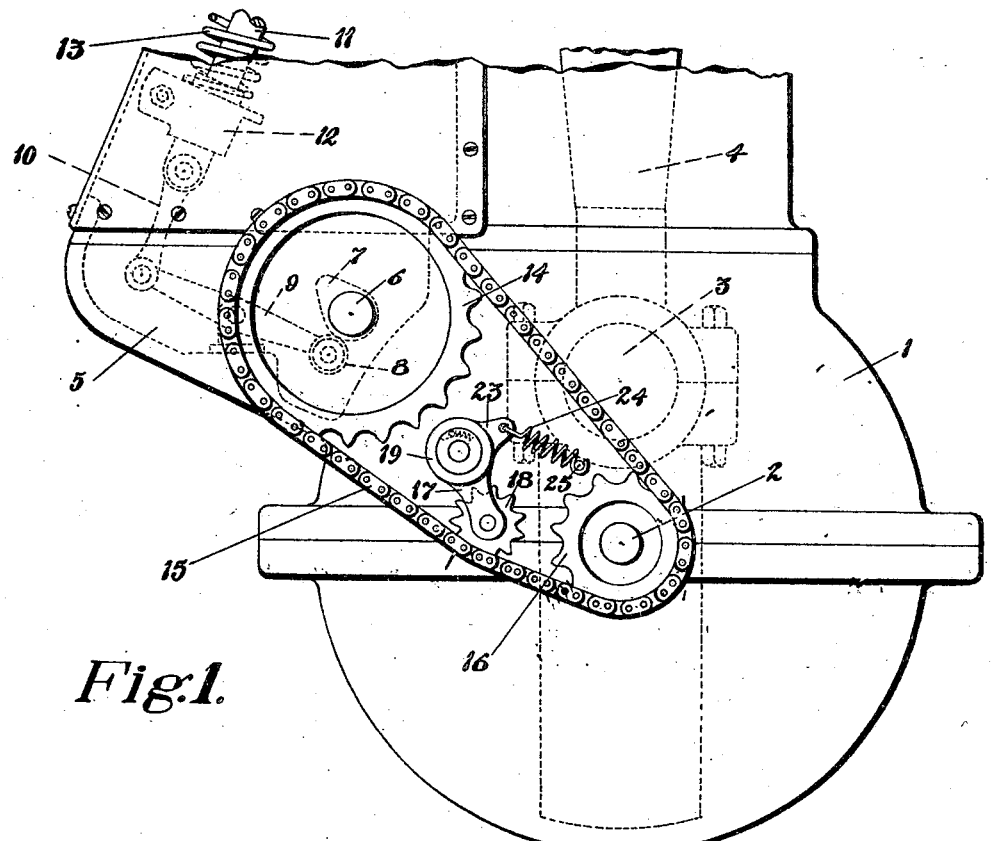

Nov. 9, 1926.  1,605,962
R. M. LOVEJOY
TIGHTENER FOR FLEXIBLE ENDLESS DRIVING MEMBERS
Original Filed Nov. 14, 1916

Inventor—
Ralph M. Lovejoy.
By—Heard Smith & Tennant.
Attorneys.

Patented Nov. 9, 1926.

1,605,962

UNITED STATES PATENT OFFICE.

RALPH M. LOVEJOY, OF MEREDITH, NEW HAMPSHIRE.

TIGHTENER FOR FLEXIBLE ENDLESS DRIVING MEMBERS.

Original application filed November 14, 1916, Serial No. 131,335. Divided and this application filed September 9, 1921. Serial No. 499,516.

This invention relates to improvements in tighteners for flexible endless driving members, such as belts or chains, through which motion is transmitted from a rotary driving member to a rotary driven member, and the principal object thereof is to provide novel means for imposing tension upon the driving member and for preventing relaxation of the driving member.

More specifically the invention relates to improvements in mechanisms for tightening the driving chain through which the valve actuating mechanism of an engine is driven from the main shaft of the engine or a counter shaft. In starting the engine, and some times during its operation, back firing takes place which tends to cause a reverse action of the piston which frequently results in throwing off the chain which drives the valve actuating mechanism from the crank shaft of the engine. The object of the present invention is to provide means for taking up the wear of the driving chain so that it is always maintained under proper tension and also in providing means which will prevent any slackness in the chain which would result in its being thrown off by reversal of movement caused by back firing of the engine.

A further object of the invention is to provide a tightener for a flexible endless driving member comprising means for forcing the tightening member into engagement with said driving member, and in providing said tightener with frictional means which will enable the tightening member to be advanced during its engagement with the driving member to take up the slack and which will prevent any substantial rearward movement of the tightening member so that the chain will be always maintained under a desired tension irrespective of jars occasioned by abnormal movements of the driving member.

The present application is a division of my prior application for patent upon improvements in internal combustion engines, No. 131,335, filed November 14, 1916, and the preferred embodiment of the invention is, therefore, illustrated herein as applied to the driving chain which transmits motion from the crank shaft of an internal combustion engine to the cam shaft which actuates the admission and exhaust valves of the engine.

Figure 2:
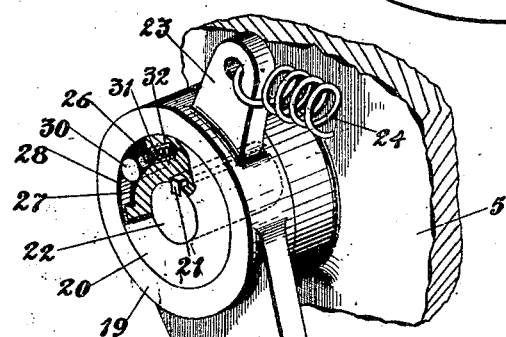

In the drawings:

Fig. 1 is an elevation of a portion of an internal combustion engine showing the invention as applied to the chain which drives the cam shaft which actuates the engine valves; and, Fig. 2 is an enlarged perspective view of the invention, a portion of the hub, upon which the tightener is mounted, being broken away to show the frictional locking mechanism for preventing backward rotation of the tightener.

The invention is illustrated in the accompanying drawings as applied to an internal combustion engine of a usual type, only a part of which is shown. The engine comprises the usual crank case 1 in which is mounted the crank shaft 2 having cranks 3 which are connected to the piston rods 4 of the engine. The lateral extension of the crank case or engine frame 5 is provided with suitable journals for a cam shaft 6 which is provided with cams 7 adapted during their rotation to engage anti-friction rollers 8 carried by the ends of levers 9, the opposite ends of which are connected by links 10 to the lower ends of the valve stems 11 which are reciprocably mounted in suitable bearings 12 and normally held in closed position by helical springs 13 surrounding the valve stems 11. Only one of the valve stems and its actuating mechanism is shown herein, but it will be understood that other valves are provided and actuated from the cam shaft by similar cams suitably located upon the cam shaft as is usual in the construction of internal combustion engines.

A sprocket wheel 14 is fixedly secured to the cam shaft 6 and is actuated through a flexible endless driving member usually a chain 15 which passes over the sprocket wheel 14 and is driven from a sprocket wheel 16, usually of smaller diameter, secured to the crank shaft 2 of the engine.

The preferred form of tightener comprises a lever preferably in the form of a bell crank, located between the leads of the chain, one arm 17 of which is provided with a sprocket wheel 18 which engages one of the leads of the driving chain 15. The bell crank lever is provided with a pivotal hub 19 which is journalled upon a sleeve 20 which is secured by a key 21 to a stud 22 projecting from the side of the crank case extension 5 or other suitable stationary member and which does not extend any substantial distance beyond the plane of the outer faces of the sprocket wheels. The other arm 23 of the bell crank lever is connected to one end of a preferably helical spring 24, the other end of which is anchored to a stud 25 upon the crank case.

The spring 24 acts normally to swing the lever about its pivot so that the sprocket 18 is pressed firmly into engagement with the chain and to maintain a constant tension thereupon. Obviously other forms of endless driving members may be used and the tightener provided with suitable means for engaging a lead of said member. It is also obvious that other means may be provided for yieldingly holding the tightening member in engagement with the flexible endless driving member.

I am aware that heretofore means of this character have been provided for imposing and maintaining a tension upon an endless driving member, but so far as I am aware no means have been provided for positively preventing backward movement of the tightener and consequently preventing the possibility of the endless driving member being thrown from the sprocket wheels or other driving means.

In the present invention the backward movement of the tightener, or take-up, for the endless driving member is prevented by frictional means so constructed as to permit a free forward or tightening movement of the tightener or take-up and which will instantly act to prevent backward or retrograde movement of the tightener.

In the preferred embodiment of the invention illustrated herein a recess is provided in one of the pivotal walls of the lever and its stationary fulcrum, the walls of the recess converging in the direction of backward rotation of the lever upon its pivot.

As illustrated in Fig. 2 of the drawing a recess 26 is formed in the periphery of the sleeve 20 with its inner wall 27, which is formed in said sleeve, converging toward the cylindrical wall 28 of the hub 19 of the bell crank lever. A locking member, preferably in the form of a cylinder 30, of larger diameter than the smaller end of the recess 26 but smaller than the larger end of the recess, is located within said recess. The recess desirably is so located that the locking member tends normally to fall by gravity toward the smaller end of the recess. Preferably, however, it is forced toward the smaller end of the recess by a suitable spring, such as a helical spring 31, seated in a socket 32 in the sleeve 20.

In the operation of the device the helical spring 24 serves to rock the tightener about its pivot or fulcrum and to force the sprocket 18 firmly against one of the leads of the driving member thereby maintaining a constant tension upon the endless driving member and taking up any wear which may occur. If by reversal of movement of the endless driving member, caused by back firing of the engine or for any other reason, pressure is wrought upon the arm 17 of the tightener which would tend to move it backwardly, that is to cause a retrograde movement thereof the engagement of the cylindrical wall 26 with the roller 30 or other locking member will force it toward the narrow end of the recess 26 thereby wedging it firmly between the walls 28 and 27 of the recess and positively preventing backward rotation so that any slackness in the endless driving member will be prevented which otherwise would enable it to be thrown from the sprockets or other rotatable actuating members.

It will be understood that the embodiment of the invention disclosed herein is of an illustrative character and that other frictional locking means for accomplishing the same purpose may be employed within the meaning and scope of the following claims.

Having thus described my invention, what I claim as new, and desire to secure by Letters Patent, is:

1. A chain tightener for an endless chain driving member comprising a lever pivotally mounted upon a cylindrical stationary fulcrum, and located between the leads of the chain, and having means engaging a lead of said endless chain, means acting upon said lever to force said chain engaging means against said chain located between the leads of the chain and a recess in the pivotal connection of said lever to said cylindrical stationary fulcrum member having walls respectively on said lever and said fulcrum member converging in the direction of backward rotation of said lever, a rotatable locking instrumentality in said recess normally tending to move toward the narrow end of said recess, whereby said lever will be locked against backward rotation.

2. A chain tightener for an endless chain driving member comprising a lever pivotally mounted upon a cylindrical stationary fulcrum and between the leads of said driving chain, and having means engaging a lead of said endless chain, means acting upon said lever to force said chain engaging means against said chain, a recess in the cylindrical wall of said stationary fulcrum member converging toward a complementary wall of the pivotal bearing of said lever in the direction of backward rotation of said lever, a cylindrical member freely movable in said recess, and resilient means acting upon said cylindrical member to force the same toward the narrow end of said recess, whereby said lever is locked against backward rotation.

3. In combination with an engine having a crank shaft, a valve actuating shaft, and means including a flexible endless chain for driving said valve actuating shaft from said crank shaft, a chain tightener comprising a lever pivotally mounted upon a cylindrical stationary fulcrum member located between the leads of the chain and having means engaging a lead of said chain, resilient means acting upon said lever to force said chain-engaging member against said chain to tighten the chain, a recess in the cylindrical wall of said stationary pivotal member converging toward the complementary wall of the pivotal bearing of said lever in the direction of backward rotation of said lever, and a cylindrical member freely movable in said recess, normally tending to move toward the narrow end of the recess, whereby said lever will be locked against backward rotation.

In testimony whereof, I have signed my name to this specification.

RALPH M. LOVEJOY.